United States Patent
Baier et al.

(10) Patent No.: US 12,248,297 B2
(45) Date of Patent: Mar. 11, 2025

(54) METHOD AND APPARATUS FOR COMPUTER AIDED OPTIMIZATION OF AN OCCUPANCY OF MAGAZINE SLOTS BY TOOLS

(71) Applicant: Siemens Aktiengesellschaft, Munich (DE)

(72) Inventors: Georg Baier, Munich (DE); Silvio Becher, Munich (DE); Lena Hupp, Munich (DE); Christian Royer, Ottobrunn (DE)

(73) Assignee: Siemens Aktiengesellschaft, Munich (DE)

( * ) Notice: Subject to any disclaimer, the term of this patent is extended or adjusted under 35 U.S.C. 154(b) by 771 days.

(21) Appl. No.: 17/435,244

(22) PCT Filed: Mar. 1, 2019

(86) PCT No.: PCT/EP2019/055122
§ 371 (c)(1),
(2) Date: Aug. 31, 2021

(87) PCT Pub. No.: WO2020/177837
PCT Pub. Date: Sep. 10, 2020

(65) Prior Publication Data
US 2022/0134497 A1  May 5, 2022

(51) Int. Cl.
*G05B 19/4093* (2006.01)
*B23Q 3/155* (2006.01)

(52) U.S. Cl.
CPC ... *G05B 19/40938* (2013.01); *B23Q 3/15503* (2016.11)

(58) Field of Classification Search
CPC ........................ G05B 19/40938; B23Q 3/15503
(Continued)

(56) References Cited

U.S. PATENT DOCUMENTS

2001/0041649 A1* 11/2001 Susnjara ................ B23Q 1/012
483/8
2007/0293379 A1 12/2007 Feinauer et al.
(Continued)

FOREIGN PATENT DOCUMENTS

CN 1973286 A 5/2007
CN 105786939 A 7/2016
(Continued)

OTHER PUBLICATIONS

Mendes, M. et al.: "A mixed-integer linear programming model for part mix, tool allocation, and process plan selection in CNC machining centres"; in: International Journal of Machine Tools and Manufacture; vol. 43; No. 11; pp. 1179-1184; XP055283617; ISSN: 0890-6955; DOI:10.1016/S0890-6955(03)00052-X; the whole document;.

(Continued)

*Primary Examiner* — Jigneshkumar C Patel
(74) *Attorney, Agent, or Firm* — Schmeiser, Olsen & Watts LLP

(57) ABSTRACT

A method for optimizing the occupancy of magazine spaces by tools within at least one tool magazine for a machine tool in a computer-supported manner is provided. One or more workpieces of one or more workpiece types is produced using the tools supplied by a magazine device at a supply area, having the following steps: a-i) detecting a number of workpieces, magazine spaces, a number of tools, required space, allowable magazines spaces for each tool, allowable starting magazine occupancy, a sequence of work steps to be carried out by the machine tool on a workpiece, work step time periods required to carry out each individual work step on the workpiece, one or more supply time periods depending on the sequence of the work steps to be carried out, and j) optimizing the occupancy of the magazine spaces by tools.

15 Claims, 3 Drawing Sheets

(58) Field of Classification Search
USPC .......................................................... 700/178
See application file for complete search history.

(56) References Cited

U.S. PATENT DOCUMENTS

| | | |
|---|---|---|
| 2008/0155521 A1 | 6/2008 | Uola |
| 2010/0004107 A1 | 1/2010 | Amaya et al. |
| 2014/0371042 A1 | 12/2014 | Bernhard et al. |
| 2015/0248128 A1 | 9/2015 | Davis et al. |
| 2020/0180089 A1* | 6/2020 | Dallinger ............ B23Q 3/15713 |
| 2020/0201299 A1 | 6/2020 | Royer |
| 2021/0240162 A1* | 8/2021 | Zoller ............... G05B 19/40938 |
| 2021/0311456 A1* | 10/2021 | Sakamoto ............. G05B 19/406 |

FOREIGN PATENT DOCUMENTS

| | | |
|---|---|---|
| CN | 108268546 A | 7/2018 |
| WO | 2016101528 A1 | 6/2016 |
| WO | WO 2019052649 A1 | 3/2019 |
| WO | WO 2020057713 A1 | 3/2020 |

OTHER PUBLICATIONS

PCT International Search Report mailed Nov. 22, 2019 corresponding to PCT International Application No. PCT/E P2019/055122 filed Mar. 1, 2019.

Lin, Xiaoyan; Research on optimization approaches based on ORACLE database application system, Computer knowledge and Technology; ISSN 1009-3044; vol. 12; No. 20; Jul. 2016; DOI:10.14004/j.cnki.ckt.2016.2660.

* cited by examiner

METHOD AND APPARATUS FOR COMPUTER AIDED OPTIMIZATION OF AN OCCUPANCY OF MAGAZINE SLOTS BY TOOLS

CROSS-REFERENCE TO RELATED APPLICATIONS

This application claims priority to PCT Application No. PCT/EP2019/055122, having a filing date of Mar. 1, 2019, the entire contents of which are hereby incorporated by reference.

FIELD OF TECHNOLOGY

The following relates to a method and a control facility for computer-aided optimization of an occupancy of magazine slots by tools within at least one tool magazine for a machine tool, wherein one or more workpieces of a workpiece type are manufactured by using the tools provided by a magazine device at a supply point.

BACKGROUND

A machine tool is an automated manufacturing facility that is used to produce a prescribed shape on a workpiece by one or more tools. Multiple tools can be associated with one tool type, e.g., milling. Another tool type can be e.g., drilling. A machine tool has a tool spindle in which the machining tool, also called the spindle tool, is located during machining.

The tools that can be used by the machine tool to machine a workpiece are stored in a tool magazine. There are various types of these. One form used very frequently is chain-type magazines, which are used e.g., in the automotive industry.

Figure 1:
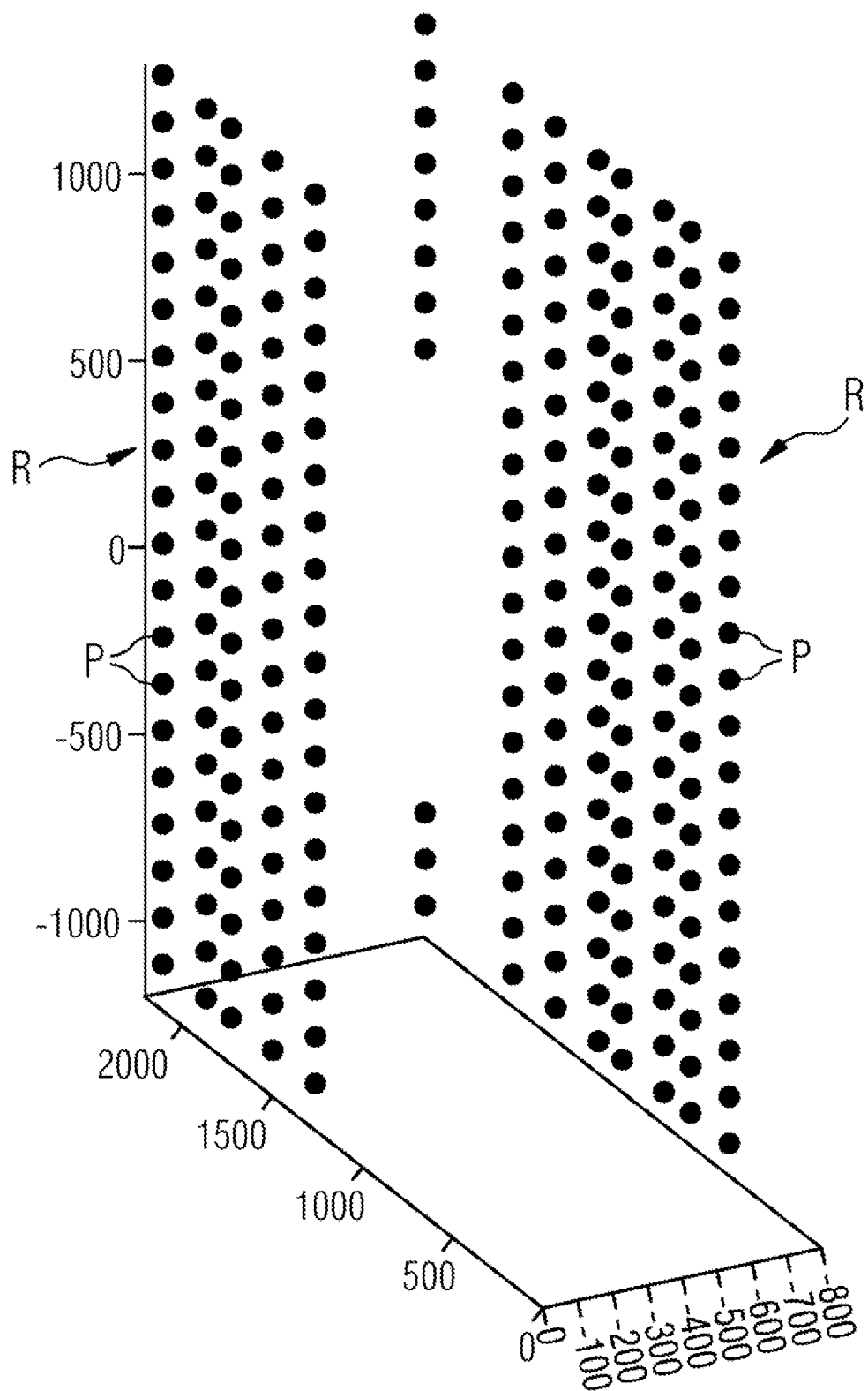

Another magazine type is shelf-type magazines R, as indicated in FIG. 1, for example, in which very many different tools can be accommodated (up to 500 tools or even possibly more). The tools are stored therein in permanent magazine slots P. Such a magazine can consist of a main side and a facing opposite side.

The shelf-type magazine has an apparatus, in particular a magazine device, which is not depicted in FIG. 1, that can be used to store and fetch a tool in its magazine slot P. This magazine type is used particularly when a wider variety of different workpieces, for which a multiplicity of different tools are needed, is supposed to be produced using one machine tool.

A workpiece of a specific workpiece type is machined using a prescribed sequence of tools. It is entirely possible for a tool to occur repeatedly in this sequence. The sequence is the same for all workpieces of a workpiece type, e.g., car seat. The sequence can be a different one for workpieces of another workpiece type.

During a work step of machining a workpiece using a tool of the sequence, the spindle tool, the "predecessor tool" of the preceding work step is returned to or replaced in its magazine slot in the shelf-type magazine. An empty run is then made to the magazine slot of the "successor tool" of the subsequent work step. The tool is then picked up and transported to a supply point. When the current work step, i.e. the machining using the current spindle tool, is finished, the tool in the spindle is exchanged (e.g., using a tool changer). If the machining using the spindle tool is finished but the successor tool for the next work step is not yet available, a waiting period arises for the spindle supply.

These individual waiting periods reduce machine efficiency and increase the production time. These waiting periods should therefore be avoided.

When minimizing the waiting periods for the spindle supply during the production of a prescribed or prescribable set of workpieces of one or more workpiece types, the following restrictions must be heeded:

Technical limitations mean that tools cannot be placed in the magazine arbitrarily, but rather must be stored appropriately according to their space requirement, e.g., according to their tool radius and other requirements. Such requirements can be their property (properties), e.g., weight of the tool or perhaps the tool length. These should be matched by the property (properties) of the magazine slot, e.g., maximum load or perhaps edge slot. Finding a permissible slot assignment for the tools is a complex task in full, large magazines.

Tools have other characteristics besides their actual tool property. They differ e.g., in terms of size and weight. Shelf-type magazines therefore have different slot types in order to accommodate the applicable tools. Furthermore, certain slots in shelf-type magazines can be disabled on account of faults or structural features. Various conditions therefore need to be met when allocating a slot.

A tool cannot usually be put into any magazine slot, i.e. there are permissible magazine slots and prohibited magazine slots for the tool and permissible and prohibited tools for each magazine slot.

A permissible magazine occupancy is an arrangement of the tools in the magazine so that each tool is in an occupiable slot and the space requirements of the tools do not overlap. Permissible magazine slots are dependent on the current occupancy of the tool magazine.

The magazine slot type of the tool and the magazine slot type of the magazine or shelf slot must be compatible. As such, e.g., large tools cannot be put in magazine slots for small tools, and possibly vice versa.

Tools must not jut out at the edge.

There must be no tools in disabled magazine slots.

If tools are oversize, one or possibly even more adjacent magazine slots need to be released.

In this context, without collision with regard to the space requirement means that a tool can be transported to or placed in a permissible magazine slot.

The initial situation is usually a shelf-type magazine filled (possibly even very full) with tools. In order to be able to heed the aforementioned restrictions, the tools are moved or rearranged in the shelf-type magazine. This cannot be performed during peak times (i.e. while production is in progress) and therefore entails a downtime for the machine tool. In this context, it makes sense to assign as many tools as possible back to the old magazine slot.

The patent application PCT/EP2017/073206 has already proposed a method for computer-aided optimization of an occupancy of magazine slots by tools within at least one tool magazine for a machine tool. The problem solution indicated in this patent application requires a powerful computer or computer unit, however, in order to be able to solve the optimization problem presented therein.

The optimum slot assignment for the tools in the magazine is often calculated on not so powerful industrial PCs having little memory space, e.g., an Edge Box. In order to avoid downtimes during production, very fast calculation of the slot assignment must be possible on industrial PCs of this kind having little memory space.

SUMMARY

An aspect relates to improving the method mentioned at the outset.

Embodiments of the invention claim a method for computer-aided optimization of an occupancy of magazine slots by tools within at least one tool magazine for a machine tool, wherein one or more workpieces of one or more workpiece types are manufactured by using the tools provided by a magazine device at a supply point, having the following steps:
  a) detecting a set of workpieces to be manufactured,
  b) detecting a set of magazine slots in at least one tool magazine,
  c) detecting a set of tools,
  d) detecting the space requirement and possibly at least one further property for each tool,
  e) detecting permissible magazine slots per tool, wherein a permissible magazine slot is dependent on the space requirement and/or on the further property of the tool and/or a detected property of the magazine slot,
  f) detecting a permissible initial magazine occupancy, wherein an initial magazine slot is detected for each tool,
  g) detecting a sequence of work steps to be performed by the machine tool on a workpiece, wherein a tool envisaged for a work step of the sequence is used to manufacture the workpiece,
  h) detecting work step times that are each needed to perform an individual work step on the workpiece,
  i) detecting one or more supply times, on the basis of the sequence of work steps to be performed and on the basis of a magazine occupancy, that are each needed by the magazine device at the supply point to provide a tool for the next work step,
  j) optimizing the occupancy of the magazine slots by tools, wherein each tool can occupy only one permissible magazine slot without collision, so that the overall waiting period is minimized, wherein the overall waiting period is made up of individual waiting periods that each result from the difference between the detected supply time and the detected work step time if the value of the difference is positive, otherwise the individual waiting period assumes the value zero,
  characterized
  k) in that the occupancy of the magazine slots by tools is optimized such that these tools are placed in the same magazine slots as the initial magazine occupancy or in permissible magazine slots close to their previously occupied magazine slot without collision.

Collision-free occupancy of the magazine slots means that the space requirements of the tools must not overlap in step j). The length of the minimized overall waiting period should be retained for performance of step k).

Placement close to the previously occupied magazine slot means that the transport time from the previously occupied magazine slot to the new magazine slot is as short as possible.

The further property can comprise the weight and/or tool radius, each of which is taken into consideration when optimizing the occupancy of the magazine slots by tools.

The detected property for each tool can comprise a weight, and a maximum load can be prescribed and/or prescribable for each magazine column consisting of a set of magazine slots, so that this load is not reached whenever the magazine slots are occupied by tools in the magazine.

The detected property for each permissible magazine slot can also comprise a rank in a hierarchic order for each tool, which order is dependent on the respective magazine slot type, so that the sum over the ranks is optimized. Depending on the sorting (ascending or descending) of the order, the sum of the ranks is minimized or maximized.

Higher ranks in this case can mean a higher preference for a magazine slot for a tool, so that tools are placed in slots with regard to their rank.

A weighting between steps j) and k) and/or the aforementioned step should be performed such that primarily the length of the overall waiting period is minimized.

The detected property of the magazine slot can be a specific slot type, e.g., an edge slot, a partial/half-slot or the maximum loading weight. The maximum loading weight can be a factor when considering a maximum loading weight for a magazine slot column or row.

The previously occupied magazine slot can be the original magazine slot and/or predecessor magazine slot.

The set of workpiece types and the quantities of the workpieces of each workpiece type that are to be manufactured are detected and are used for optimizing the occupancy of the magazine slots by tools.

Advantages of embodiments of the invention are:
  shorter production times of the machine tools
  shorter paths of travel or supply times of the magazine device of a shelf-type magazine, which ultimately introduces an energy saving and longer durability.

The supply time is made up of a fetch time, which comprises the time for the magazine device to fetch a tool to the supply point from one magazine slot permissible for the tool, and of a replace time, which comprises the time for the magazine device to replace a tool from the supply point to one magazine slot permissible for the tool, and of an empty-run time for an empty run by the magazine device from a first magazine slot to another, second magazine slot.

The tools can be relocated by a magazine device of the tool magazine according to the aforementioned optimized occupancy.

The optimization can be performed by mixed integer linear optimization.

A set of magazine slots that are each permanently occupied by a tool and that cannot be occupied by other tools as a result of the optimization can be detected.

One development provides for the critical tools for which the waiting period assumes a value greater than zero to each be assigned a destination magazine slot according to the aforementioned optimized occupancy, and furthermore for a set of transport times required in each case for a journey by the magazine device from one magazine slot to another magazine slot to be detected,
  a) wherein a set of tool transports is determined for which an order of transport is prescribable or prescribed, so that the critical tools or a subset thereof can be taken from their occupied magazine slot (or initial magazine slot) to their destination magazine slot in this order of transport without collision with regard to their space requirement, and
  b) wherein the order of transport for this set of tool transports is optimized such that the sum of the transport times required for these tool transports is minimized.

One development of embodiments of the invention provides for at least one critical tool from the detected set of tools to be transported from the magazine slot that it occupies to another occupiable magazine slot without collision in order to determine an at least single-element subset of tool transports according to step a) above and in order to continue with step b) above.

"Without collision" in this context means: the tools, if allocated a different magazine slot than the initial magazine slot, need to be moved or rearranged in the tool magazine without collision.

One development of embodiments of the invention provides for at least one critical tool from the detected set of tools that remains in a magazine slot that it occupies, but is supposed to be transported to another occupiable magazine slot without collision, to be placed in a magazine slot close to the magazine slot calculated according to step k) above, wherein step a) can be used to determine a set of tool transports, so that the overall waiting period is minimized.

The tool transports can be performed using the magazine device according to the optimized order of transport.

A further aspect of embodiments of the invention provides for a control facility that is in particular designed to perform the method of the aforementioned type and the embodiments thereof. The control facility (not shown in FIG. 1) can be a computer associated with the machine tool, and possibly arranged remotely, or a control module integrated in the machine tool.

The control facility for computer-aided optimization of an occupancy of magazine slots by tools within at least one tool magazine for a magazine tool, wherein one or more workpieces of one or more workpiece types are manufactured using the tools provided by a magazine device at a supply point, has:
  a) a first unit for detecting a set of workpieces to be manufactured,
  b) the same or a second unit for detecting a set of magazine slots in at least one tool magazine,
  c) the same or a third unit for detecting a set of tools,
  d) the same or a fourth unit for detecting the space requirement and possibly at least one further property for each tool,
  e) the same or a fifth unit for detecting permissible magazine slots per tool, wherein a permissible magazine slot is dependent on the space requirement and/or on the further property of the tool and/or a detected property of the magazine slot,
  f) the same or a sixth unit for detecting a permissible initial magazine occupancy, wherein an initial magazine slot is detected for each tool,
  g) the same or a seventh unit for detecting a sequence of work steps to be performed by the machine tool on a workpiece, wherein a tool envisaged for a work step of the sequence is used to manufacture the workpiece,
  h) the same or an eighth unit for detecting work step times that are each needed to perform an individual work step on the workpiece,
  i) the same or a ninth unit for detecting one or more supply times, on the basis of the sequence of work steps to be performed and on the basis of the initial magazine occupancy, that are each needed by the magazine device at the supply point to provide a tool for the next work step,
  j) an optimization unit for optimizing the occupancy of the magazine slots by tools, wherein each tool can occupy only one permissible magazine slot without collision, so that the overall waiting period is minimized, wherein the overall waiting period is made up of individual waiting periods that each result from the difference between the detected supply time and the detected work step time if the value of the difference is positive, otherwise the individual waiting period assumes the value zero, characterized by
  k) a further optimization unit for optimizing the occupancy of the magazine slots by tools such that these tools are placed in the same magazine slots as the initial magazine occupancy or in permissible magazine slots close to their previously occupied magazine slot without collision.

Two, three, four, five, etc., of the first, second, third, fourth, fifth, sixth, seventh, eighth and ninth detection units can be incorporated in one detection unit in any combination in this case.

A further aspect of embodiments of the invention is a computer program (product) having program code means or program code for performing the method as claimed in one of the preceding method claims when the computer program (product) runs on a control facility of the aforementioned type or is stored on a computer-readable medium.

The computer program or a computer program product (non-transitory computer readable storage medium having instructions, which when executed by a processor, perform actions) can be stored on a computer-readable medium. The computer program or computer program product can be created in a standard programming language (e.g., C++, Java). The processing facility can comprise a current computer or server having appropriate input, output and storage means or storage. This processing facility can be integrated in the control facility or in the means thereof.

The control facility and the computer program (product) can be developed or designed analogously to the aforementioned method.

BRIEF DESCRIPTION

Figure 2:
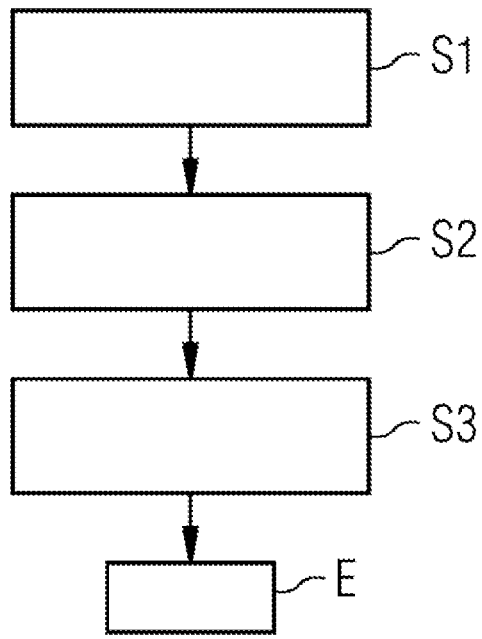
Figure 3:
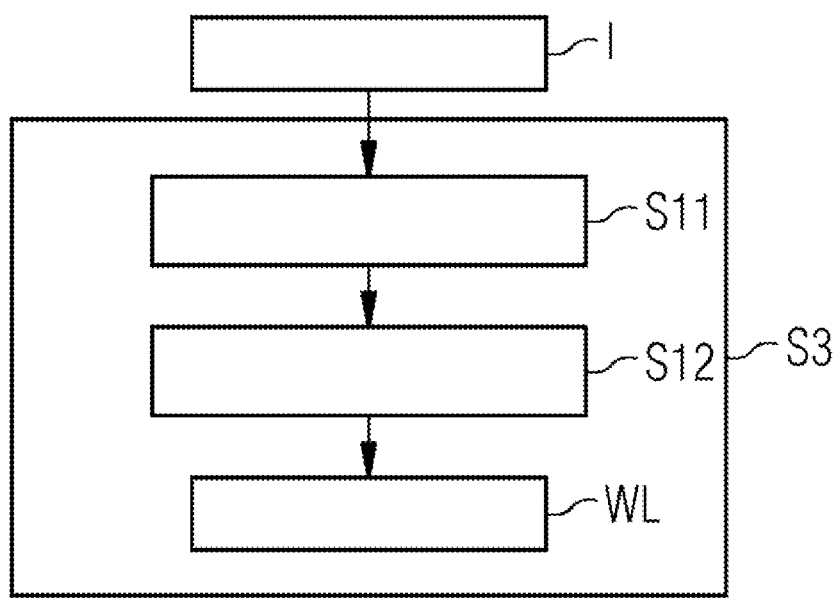
Figure 4:
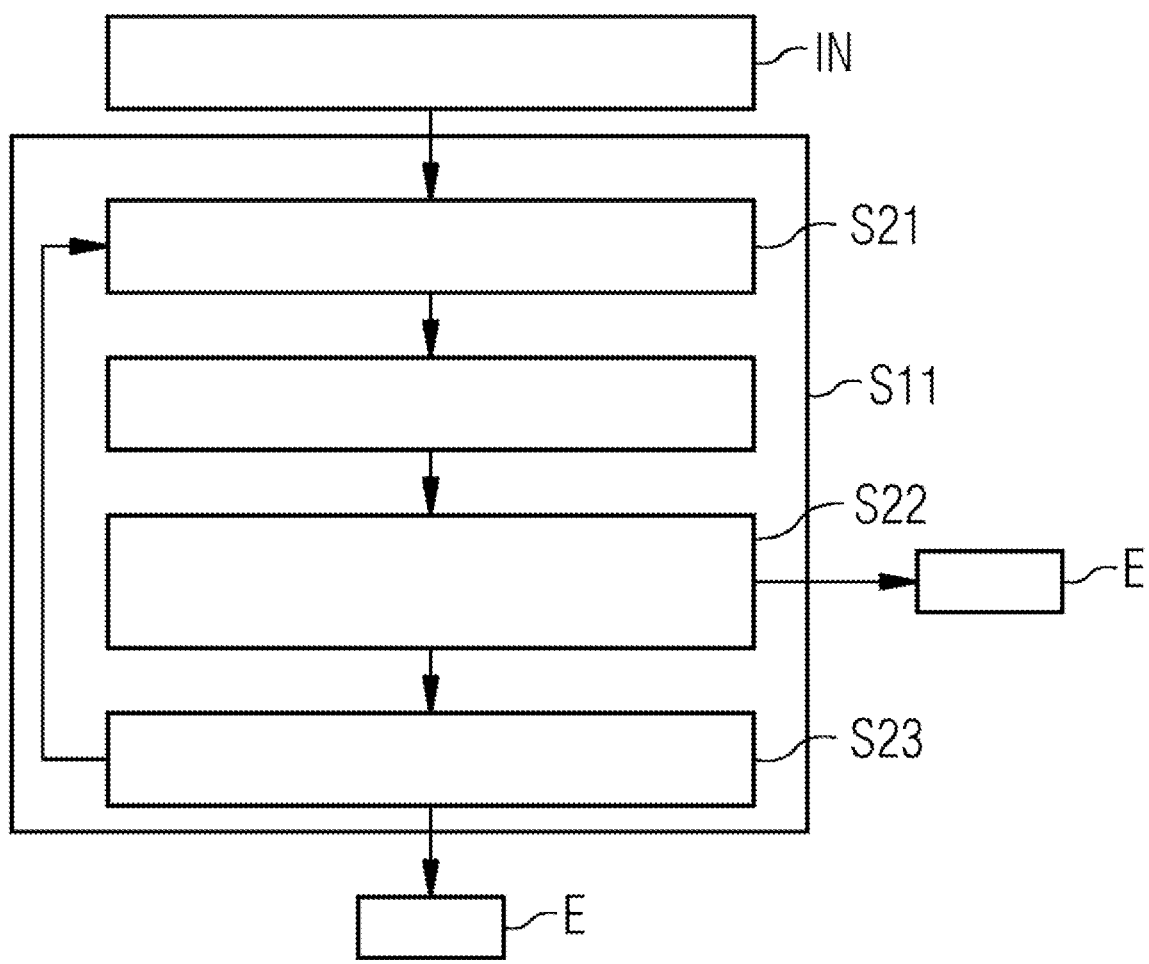

Some of the embodiments will be described in detail, with references to the following Figures, wherein like designations denote like members, wherein:

FIG. 1 shows the slots in a shelf-type magazine that were mentioned at the outset; wherein the main side is arranged to the right and the opposite side is arranged to the left;

FIG. 2 schematically shows a flowchart for the iterative method with a starting configuration, the iterative method involving the use of the integer linear optimization method;

FIG. 3 schematically shows a flowchart for the calculation of a tool transfer list; and FIG. 4 schematically shows an overview of the nearest neighbor method for step S11 from FIG. 3.

DETAILED DESCRIPTION

Minimization of the waiting periods for the spindle supply during the production of a prescribed set of workpieces of one or more types by specific placement of the tools in the shelf-type magazine is the fundamental optimization criterion.

The initial situation—denoted by step S1—is usually a shelf-type magazine filled (possibly even very full) with tools. It is possible to apply the heuristics from the patent application "Assigning tools to slots in a tool magazine" having the same priority in order to obtain a first permissible solution or destination assignment for the tools in the magazine. The heuristics place all critical tools first.

The maximum length of a cycle (returning or replacing, intermediate run and fetching) can be calculated. The operations or work steps that have a shorter production/manufacturing time than the maximum cycle time are referred to as critical. Critical tools refers to those tools that need to be returned to or fetched from the shelf-type magazine during critical operations. The other tools are referred to as non-critical tools.

The heuristics provide optimization only with regard to the waiting period, however. Later rearrangement of the tools is not taken into consideration in this case. The noncritical tools should be put into their initial slots where possible, however, in order to minimize rearrangement time. It therefore makes sense for the remainder of the tools that are to be placed to be inserted into the magazine by the method from the patent application "Method for computer-aided optimization of an occupancy of magazine slots by tools" having the same priority. This results in a permissible but not necessarily optimum solution or destination assignment for the tools that takes into consideration firstly the waiting period and secondly later rearrangement.

The calculation of an optimum solution or destination assignment takes place in step S2. A further optimization criterion, according to embodiments of the invention, is placement of as many tools as possible in the "old" or preceding or previously occupied magazine slot or close thereto. Moreover, the optimization should take place such that slots are chosen according to the slot hierarchization where possible.

Accordingly, the occupancy of the magazine slots by tools should be optimized such that the tools are placed in magazine slots close to their previously occupied magazine slot and this involves the slot hierarchizations being taken into consideration. In other words, a permissible slot assignment for all tools should be determined, so that the overall waiting period for the spindle supply during production is minimized and the tools are placed in slots, as far as possible, that are situated close to their original slots or predecessor magazine slots.

The tools are then moved or rearranged in the shelf-type magazine in step S3. This cannot be performed during peak times (i.e. while production is in progress) and therefore entails a downtime for the machine tool.

A special case of optimization methods is linear optimization. It is concerned with the optimization of linear target functions over a set that is limited by linear equations and in equations. It is the basis of the solution processes of (mixed) integer linear optimization. What is known as a solver is a collective name for specific mathematical computer programs that can solve mathematical problems numerically. In association with MILP (mixed integer linear programming), standard solvers such as e.g., CPLEX, Scip, Gurobi, Xpress can be used for IP programs (integer optimization models).

The text below describes an example in which an MTLP (mixed integer linear programming) model is used to perform a computer-aided optimization of an occupancy of magazine slots by tools within at least one tool magazine for a machine tool, wherein one or more workpieces of a workpiece type can be manufactured by an occupancy of the magazine slots by tools.

The following designations apply in the MILP formulation:

Input Parameters:

| | |
|---|---|
| L | Set of all magazine slots |
| T | Set of all tools |
| $T_l$ | Set of the tools permissible for slot l |
| $cov_{l,\hat{l}}^t$ | Covered proportion of the space between slots l and $\hat{l}$ when tool t is in slot l, $0 \leq cov_{l,\hat{l}}^t \leq 1$ |
| W | Set of the workpieces |
| $Op_w$ | Sequence of operations or work steps to be performed by the machine tool for workpiece type w, i.e. $Op_w = (Op_w^1, \ldots, Op_w^{n_w})$ |
| $quantity_w$ | Quantity to be manufactured of workpiece w |
| $prodTime_w^i$ | Time of $Op_w^i$ |
| $t_w^i$ | Tool in $Op_w^i$ |
| $CritOp_w$ | Set of the operations for workpiece w after which waiting period can arise (critical operations) |
| C | Set of predecessor/successor tools (t, t') for operations after which a waiting period can arise (critical tools). |
| $putTime_{t,l}$ | Time for returning tool t from the supply point to slot l |
| $getTime_{t,l}$ | Time for fetching tool t from slot l to the supply point |
| $moveTime_{l_1, l_2}$ | Time for the empty run from slot $l_1$ to slot $l_2$ |
| $toolMoveTime_{l_1, l_2}^t$ | Time for the transport of tool t from slot $l_1$ to slot $l_2$ |
| $PreferenceToolLocation_{t,l}$ | Positive number describing the preference or rank for placing the tool t in slot l. A low value indicates a low preference, a high value a high preference. |
| weightWaitingTime | Weighting of the waiting period in the target function or for the optimization |
| weightNearestLocation | Weighting of the priority in the target function or for the optimization that noncritical tools are put close to their original slot |
| weightNearestLocationCriticalTools | Weighting of the priority in the target function or for the optimization that critical tools are put close to their original slot |
| weightHierarchy | Weighting of the priority in the target function or for the optimization that the tools are placed in preferred slots (with regard to the given hierarchy) |

Variables:

| | |
|---|---|
| $setup_{t,l}$ | Slot assignment of tool t to slot l (value 1 if the tool is allocated to the slot, otherwise 0) |
| $waitingTime_w^i$ | Non-negative waiting period arising for workpiece w after operation i |
| $h_{t_1, t_2, l_1, l_2}$ | Auxiliary variables assuming the value 1 if tool $t_1$ is in slot $l_1$ and tool $t_2$ is in slot $l_2$. Otherwise, the variable is set to the value 0. |

This notation can be used to formulate the problem as the following integer linear program.

Minimization Function:

A target function made up of multiple weighted components allows multiple target criteria to be optimized at the same time. These are controlled by weighting parameters, which are provided as input. The main criterion remains the minimization of the waiting period, the criterion being able to be weighted using the parameter weightWaitingTime$\geq 0$.

The new tool assignment calculated by the optimization needs to be physically produced in the machine by conversions. The machine is likely to be at a standstill during this time. It is therefore an improvement if a tool t is put as close as possible to the old or original slot $l^{old}_t$ as a result of the optimization. The distance measure used can be the time $$toolMoveTime^l_{l^{old}_t,l}$$

for transporting the tool t from the original slot $l^{old}_t$ to the new slot l. Since critical tools t∈C can cause a waiting period, reduction of the waiting period therefor is prioritized ahead of placement close to the original slot. The noncritical tools should be put as close to their original slot as possible in order to minimize the conversion time for the subsequent conversion. This can be controlled by way of the parameter weightNearestLocationCriticalTools≥0 for the critical tools and by way of weightNearestLocation≥0 for the noncritical tools. Generally, the weight weightNearestLocation is chosen to be much higher than the weight weightNearestLocationCriticalTools. In addition, the tools should be placed in slots that are preferred for them (with regard to their rank in the slot hierarchy) where possible. The weighting in the target function can be controlled by way of the parameter weightHierarchy≥0.

$$weightWaitingTime \cdot \sum_{w \in W} \sum_{i \in CritOp_w} waitingTime^i_w \cdot quantity_w +$$

$$weightNearestLocation \cdot \sum_{t \in T/C} \sum_{l \in L} setup_{t,l} \cdot toolMoveTime^l_{l^{old}_t,l} +$$

$$weightNearestLocationCriticalTools \cdot \sum_{t \in C} \sum_{l \in L} setup_{t,l} \cdot toolMoveTime^l_{l^{old}_t,l} -$$

$$weightHierarchy \cdot \sum \sum setup_{t,l} \cdot PreferenceToolLocation_{t,l}$$

Constraints:
(1) Each tool must be allocated a magazine slot.

$$\sum_{l \in L} setup_{t,l} = 1, \quad t \in T,$$

(2) A magazine slot must not be allocated more than once.

$$\sum_{t \in T} setup_{t,l} \leq 1, \quad l \in L,$$

(3) A magazine slot must not contain a tool that is prohibited for this slot.

$$\sum_{t \in T/T^l} setup_{t,l} = 0, \quad l \in L,$$

(4) For a tool pair $(t_1, t_2) \in C$, $h_{t1,t2,l1,l2}$ is 1 precisely when $t_1$ is in $l_1$ and $t_2$ is in $l_2$.

$$setup_{t_1,l_1} = \sum_{l_2 \in L, l_1 \neq l_2} h_{t_1,t_2,l_1,l_2}, \quad l_1 \in L, (t_1, t_2) \in C, t_1 \neq t_2,$$

$$setup_{t_2,l_2} = \sum_{l_1 \in L, l_1 \neq l_2} h_{t_1,t_2,l_1,l_2}, \quad l_2 \in L, (t_1, t_2) \in C, t_1 \neq t_2,$$

$$h_{t_1,t_2,l_1,l_2} = h_{t_2,t_1,l_2,l_1}, \quad \begin{array}{l} l_1 \in L, l_2 \in L, (t_1, t_2) \in C: \\ (t_2, t_1) \in C, t_1 \neq t_2, l_1 \neq l_2. \end{array}$$

(5) A waiting period arises if the operation $Op^i_w$ is shorter than the time needed by the magazine for returning the previous tool, the intermediate run to the next tool and providing the next tool.

For all w∈W, i∈CritOp$_w$ with $t_w^{i-1} \neq t_w^{i+1}$, it holds that:

$$waitingTime^i_w \geq \sum_{l_1 \in L} putTime_{t,l_1} \cdot setup_{t_w^{i-1},l_1} + \sum_{l_2 \in L} getTime_{t,l_2} \cdot setup_{t_w^{i+1},l_2} +$$
$$\sum_{l_1 \in L, l_2 \in L: l_1 \neq l_2} moveTime_{l_1,l_2} \cdot h_{t_w^{i-1},t_w^{i+1},l_1,l_2} - prodTime^i_w$$

For all w∈W, i∈CriOp$_w$ with $t_w^{i-1} = t_w^{i+1}$, it holds that:

$$waitingTime^i_w \geq \sum_{l \in L} putTime_{t,l} \cdot setup_{t_w^{i-1},l} +$$
$$\sum_{l \in L} getTime_{t,l} \cdot setup_{t_w^{i+1},l} + \sum_{l \in L} moveTime_{l,l} \cdot setup_{t_w^{i-1},t_w^{i+1},l} - prodTime^i_w$$

(6) Slots covered by a tool must not be occupied by tools and two tools must not collide.

$$\sum_{t \in T} cov^t_{l_1,l_2} \cdot setup_{t,l_1} + \sum_{t \in T} cov^t_{l_2,l_1} \cdot setup_{t,l_2} \leq 1, \quad l_1, l_2 \in L, l_1 \neq l_2$$

(7) Variable restrictions,

| | |
|---|---|
| setup$_{t,l}$ ∈ {0, 1}, | t ∈ T, l ∈ L |
| waitingTime$_w^i$ ≥ 0, | w ∈ W, i ∈ CritOp$_w$ |
| h$_{t_1, t_2, l_1, l_2}$ ≥ 0, | l$_1$ ∈ L, l$_2$ ∈ L, (t$_1$, t$_2$) ∈ C, t$_1$ ≠ t$_2$, l$_1$ ≠ l$_2$ |

The variables $h_{t1,t2,l1,l2} \geq 0$ are binary variables. This additional information can be handed over to the solver. However, it is advantageous to set them as continuous variables.

Model Reductions:

The group of restrictions, (6), for taking into consideration the space requirements of the tools comprise many superfluous inequations. For many magazine slot pairs $l_1$, $l_2 \in L$, $l_1 \neq l_2$, these inequations are always satisfied because the two magazine slots are a very long way apart. It suffices to consider slot pairs for which there is a tool pair that can be stored in these slots and collides. If there is no such tool pair, the inequations have no limiting character and can be omitted.

Maximum Loading Weight or Load Per Magazine Column:

In addition, a maximum loading weight maxWeightMag(i)≥0 per magazine column can be taken into consideration by adding additional restrictions. In this regard, let M be the number of columns of the magazine and Mag(i) the set of magazine slots in column i, i=1, . . . , M. For each tool t∈T, its weight toolweight(t) is moreover provided. It is thus possible to formulate the restrictions as follows:

$$\sum_{l \in Mag(i)} \sum_{t \in T} toolweight(t) \cdot setup_{t,l} \le maxWeightMag(i), \quad i = 1, \ldots, M.$$

The controllers of machine tools offer different types of management for shelf-type magazines. A type that is possible e.g., in Sinumerik controllers is the partial-slot model. The partial-slot model allows partial occupancy of a magazine slot by a tool. A kind of special form of the partial-slot model is the half-slot model.

A feature in the half-slot model is that tools do not have to be symmetrical. One tool takes up two half-slots both at the top and bottom and to the left and right (depending on the point of view). By contrast, another tool takes up two half-slots at the top and three half-slots at the bottom and to the left and right (depending on the point of view). Both tools overlap the adjacent slot, but do not collide there, since they each cover only the upper or lower or left or right half-slot.

When optimizing the occupancy of the magazine slots, the partial/half-slots can be taken into consideration with the aim that no partial/half-slot is covered by multiple tools.

The result from steps S1 and S2 is optimized occupancy of the magazine slot by tools, the length of the overall waiting period being minimized.

In the next step S3, the aim is to determine a transfer list WL that can be used to move the critical tools to their destination slots or at least to magazine slots that improve the overall waiting period for the spindle supply. The noncritical tools should remain in their old slots where possible.

This transfer list is ascertained in multiple steps:

In step S11 in FIG. 3, a nearest neighbor method is first called, which attempts to perform the tool transfers with critical tools. If necessary, interfering tools in the destination slots or the slots adjacent thereto are pushed to alternative slots. The next tool transfer chosen in each case is the one whose current magazine slot has the minimum empty-run time to the most recently visited magazine slot.

It may be that not all critical tools can be shifted to their destination slots. An attempt is therefore made in step S12 to move each of these to a different magazine slot, so that the overall waiting period is reduced further.

In step S11, a method is first needed in order to be able to perform an individual tool transfer of a critical tool to a possibly occupied destination slot that takes into consideration the space restrictions. The tool that is supposed to be shifted is called the transfer tool below. The function Tool transfer(transfer tool, destination slot) checks whether a given transfer tool can be moved to its destination magazine slot. This possibly first requires other tools to be cleared away in order to clear the destination magazine slot. This set of tools to be cleared away is referred to as W(destination slot).

Tool transfer(transfer tool, destination slot){ i. Determine all tools W(destination slot) that need to be transferred away in order to be able to permissibly shift the transfer tool to the destination slot.

ii. Attempt a direct transfer for all tools W(destination slot).

iii. If direct transfer is not possible, attempt a nondirect transfer.

iv. When all tools W(destination slot) have been transferred away, the transfer tool is shifted to its destination slot. Otherwise, no transfer is performed.

}

The direct transfer looks for a vacant slot for a transfer tool, to which the transfer tool can be transported directly without violating space restrictions and without other tools needing to be shifted in the magazine. If this is possible, the transfer is performed immediately. Otherwise, a nondirect transfer is attempted. This involves looking for a magazine slot that can be cleared for the tool by a direct transfer of one or more tools in the magazine. The direct transfers of the other tools are performed first, after which the transfer tool is shifted. If neither a direct nor a nondirect transfer is possible, no transfer is performed for the tool. An overview of the nearest neighbor method, in which the function Tool transfer(transfer tool, destination slot) is embedded, is provided by FIG. 4.

The aim of this method is to transfer a set of critical tools $T_{transfer}$, if possible, to the prescribed destination slots. The method is a nearest neighbor method, which attempts, in the next particular step, to always perform the transfer for which the empty-run time of the magazine device from the current location to the magazine slot of the tool that is supposed to be transported next is the minimum.

The input IN of the method is a set of critical tools, the associated destination slots thereof and the most recently visited location of the magazine control device.

The tools from $T_{transfer}$ are sorted in step S21 according to ascending empty-run time from the most recently visited location of the magazine device to the respective magazine slot of the tool. In step S22, an attempt is made to perform a tool transfer for the first possible tool on the resulting transfer list list($T_{transfer}$) using the function Tool transfer (transfer tool, destination slot). If this is not possible, the method ends, denoted by E. Otherwise, the transferred tool is fixed in its destination slot in step S23 and erased from the list $T_{transfer}$. If a tool is fixed in its destination slot, it can no longer be moved away from the slot in the course of the method. The magazine device is then at the destination slot of the transferred tool, the list $T_{transfer}$ is sorted again and another attempt is made to transfer a tool, until it is no longer possible to transfer a tool from the list $T_{transfer}$ or $T_{transfer}$ is empty. In the latter case, the whole method terminates, also denoted by E, since all critical tools have been able to be transported to their destination magazine slot. If $T_{transfer}$ is not empty, an attempt is made in the next step S12 in FIG. 3 to move the as yet untransferred critical tools to magazine slots that further improve the overall waiting period in comparison with the current magazine slot occupancy.

Step S12 proceeds in a similar manner to step S11. The input is the set of all critical tools and the critical tools with the associated destination slots that have not yet been transferred, and also the most recently visited location of the magazine device. Moreover, the current magazine occupancy after step S11 is needed. The tools from $T_{transfer}$ are again sorted according to ascending empty-run time from the most recently visited location to the respective magazine slot of the tool. The first particular tool is taken from the list (and erased from the list). The function Tool transfer(transfer tool, destination slot) is used to attempt to move the tools to magazine slots that further reduce the overall waiting period in comparison with the current magazine occupancy. To this end, the potential destination magazine slots for the tool to be transferred are sorted according to ascending improvement of the overall waiting period. To calculate the improvement of the overall waiting period, all critical tools (apart from the tool to be transferred) are briefly fixed. This means that only possible destination magazine slots for which no critical tools need to be transferred are considered for the transfer tool. The function Tool transfer(transfer tool, destination slot) is used to attempt to move the transfer tool to one of the magazine slots from the list in sequence. If this is not possible for any magazine slot or if the list of possible magazine slots is empty, the next tool is taken from the list ($T_{transfer}$). A transfer is performed for the first possible slot from the sorted list of magazine slots, which improves the overall waiting period in comparison with the current magazine occupancy. The magazine occupancy is updated and the transfer tool is fixed in its new slot. Next, the list ($T_{transfer}$) is sorted again. The method terminates when the list of critical tools is empty.

The method presented above can additionally be combined with the method already proposed in the patent application PCT/EP2018/074999. Some of the critical tools can be transferred to their destination slots beforehand, as described in this patent application. The starting and destination assignments are first used to ascertain the set of tool transfers to be performed, each consisting of a tool and a destination slot, and the precedence relationships thereof. To calculate an optimum order for the (precedence-)cycle-free tool transfers, an asymmetric TSP (traveling salesman problem) is described that is solved using the mixed integer linear program specified therein. The critical tools in precedence cycles can then subsequently be transferred using the method according to embodiments of the invention. This allows computation time to be reduced.

Although embodiments of the invention have been illustrated and described more specifically in detail by the exemplary embodiment, the invention is not limited by the disclosed examples, and other variants can be derived therefrom by a person skilled in the art without departing from the scope of protection of embodiments of the invention.

The implementation of the processes or method sequences described above can be provided on the basis of instructions that are available on computer-readable storage media or in volatile computer memories (referred to collectively below as computer-readable memories). Computer-readable memories are for example volatile memories such as caches, buffers or RAM and also nonvolatile memories such as removable data carriers, hard disks, etc.

The functions or steps described above can be present here in the form of at least one instruction set in/on a computer-readable memory. In this case, the functions or steps are not tied to a specific instruction set or to a specific form of instruction sets or to a specific storage medium or to a specific processor or to specific execution schemes and can be implemented by software, firmware, microcode, hardware, processors, integrated circuits, etc., in standalone operation or in arbitrary combination. In this case, a wide variety of processing strategies can be employed, for example serial processing by a single processor or multi-processing or multitasking or parallel processing, etc.

The instructions can be stored in local memories, but it is also possible to store the instructions on a remote system and to access them via a network.

"Computer-aided" can be understood within the context of embodiments of the invention to mean for example an implementation of the method in which in particular a processor carries out at least one method step of the method.

The term "processor", "central signal processing", "control unit" or "data evaluation means or data evaluation device", as used here, encompasses processing means or processor in the broadest sense, that is to say for example servers, general purpose processors, graphics processors, digital signal processors, application-specific integrated circuits (ASICs), programmable logic circuits such as FPGAs, discrete analog or digital circuits and arbitrary combinations thereof, including all other processing means or processor that are known to a person skilled in the art or will be developed in the future. In this case, processors can consist of one or more apparatuses or facilities or units. If a processor consists of multiple apparatuses, the latter can be designed or configured for the parallel or sequential processing or execution of instructions. A "memory unit" can be understood within the context of embodiments of the invention to mean for example a memory in the form of random-access memory (RAM) or a hard disk.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer aided optimization of an occupancy of magazine slots by tools within at least one tool magazine for a machine tool, wherein one or more workpieces of one or more workpiece types are manufactured by using the tools provided by a magazine device at a supply point, comprising:
a) detecting a set of workpieces to be manufactured,
b) detecting the magazine slots in at least one tool magazine,
c) detecting the tools,
d) detecting a space requirement and possibly at least one further property for each tool,
e) detecting permissible magazine slots per tool, wherein a permissible magazine slot is dependent on the space requirement and/or on the further property of the tool and/or a detected property of the magazine slot,
f) detecting a permissible initial magazine occupancy, wherein an initial magazine slot is detected for each tool,
g) detecting a sequence of work steps to be performed by the machine tool on a workpiece, wherein a tool envisaged for a work step of the sequence is used to manufacture the workpiece,
h) detecting work step times that are each needed to perform an individual work step on the workpiece,
i) detecting one or more supply times, on a basis of the sequence of work steps to be performed and on a basis of a magazine occupancy, that are each needed by the magazine device at the supply point to provide the tool for a next work step,
j) optimizing the occupancy of the magazine slots by the tools, wherein each tool can occupy only one permissible magazine slot without collision, so that an overall waiting period is minimized, wherein the overall waiting period is made up of individual waiting periods that each result from a difference between the detected supply time and the detected work step time if a value of the difference is positive, otherwise the individual waiting period assumes the value zero,
wherein
k) the occupancy of the magazine slots by the tools is optimized such that these tools are placed in the magazine slots as the initial magazine occupancy or in the permissible magazine slots close to their previously occupied magazine slot without collision.

2. The method as claimed in claim 1, wherein a weighting between steps j) and k) is performed.

3. The method as claimed in claim 1, wherein the detected property for each permissible magazine slot comprises a rank in a hierarchic order for each tool, which order is dependent on the respective magazine slot type, so that a sum over the ranks is optimized.

4. The method as claimed in claim 1, wherein a weighting between steps j), k) is performed.

5. The method as claimed in claim 1, wherein the supply time is made up of a fetch time, which comprises the time for the magazine device to fetch the tool to the supply point from one magazine slot permissible for the tool, and of a replace time, which comprises the time for the magazine device to replace a tool from the supply point to one magazine slot permissible for the tool, and of an empty run time for an empty run by the magazine device from a first magazine slot to another, second magazine slot.

6. The method as claimed in claim 1, wherein the tools are relocated by a magazine device of the tool magazine according to the optimized occupancy.

7. The method as claimed in claim 1, wherein the optimization is performed by mixed integer linear optimization.

8. The method as claimed in claim 1, wherein a set of magazine slots that are each permanently occupied by the tool is detected.

9. The method as claimed in claim 1, wherein the detected property for each tool comprises a weight, and a maximum load is prescribed and/or prescribable for each magazine column consisting of a set of magazine slots, so that this load is not reached whenever the set of magazine slots is occupied by the tools in the magazine.

10. The method as claimed in claim 1, wherein critical tools for which the waiting period assumes or can assume a value greater than zero are each assigned a destination magazine slot according to the optimized occupancy, and furthermore a set of transport times required in each case for a journey by the magazine device from one magazine slot to another magazine slot is detected,
   l) Wherein a set of tool transports is determined for which an order of transport is prescribable or prescribed, so that the critical tools or a subset thereof can be taken from their occupied magazine slot to their destination magazine slot in this order of transport without collision with regard to their space requirement, and
   m) wherein the order of transport for this set of tool transports is optimized such that a sum of the transport times required for these tool transports is minimized.

11. The method as claimed in claim 1, wherein at least one critical tool from the detected tools is transported from the magazine slot that it occupies to another occupiable magazine slot without collision in order to determine an at least single-element subset of tool transports according to step l) and in order to continue with step m).

12. The method as claimed in claim 11, wherein at least one critical tool from the detected tools that remains in a magazine slot that it occupies, but is supposed to be transported to another occupiable magazine slot without collision, is placed in a magazine slot close to the magazine slot calculated according to step k), wherein step l) can be used to determine a set of tool transports, so that the overall waiting period is minimized.

13. The method as claimed in claim 1, wherein the tool transports are performed using the magazine device according to the optimized order of transport.

14. A computer program product, comprising a computer readable hardware storage device having computer readable program code stored therein, said program code executable by a processor of a computer system to implement a method having program code means or program code for performing the method as claimed claim 1 when the computer program product runs on a control facility or is stored on a computer readable medium.

15. A control facility for computer aided optimization of an occupancy of magazine slots by tools within at least one tool magazine for a magazine tool, wherein one or more workpieces of one or more workpiece types are manufactured using the tools provided by a magazine device at a supply point, said control facility comprising a processor and a computer readable hardware storage device having computer readable program code stored therein, said program code executable by the processor to perform a method, said method comprising:
   a) detecting a set of workpieces to be manufactured,
   b) detecting the magazine slots in at least one tool magazine,
   c) detecting the tools,
   d) detecting a space requirement and possibly at least one further property for each tool,
   e) detecting permissible magazine slots per tool, wherein a permissible magazine slot is dependent on the space requirement and/or on the further property of the tool and/or a detected property of the magazine slot,
   f) detecting a permissible initial magazine occupancy, wherein an initial magazine slot is detected for each tool,
   g) detecting a sequence of work steps to be performed by the machine tool on a workpiece, wherein a tool envisaged for a work step of the sequence is used to manufacture the workpiece,
   h) detecting work step times that are each needed to perform an individual work step on the workpiece,
   i) detecting one or more supply times, on a basis of the sequence of work steps to be performed and on a basis of the initial magazine occupancy, that are each needed by the magazine device at the supply point to provide a tool for a next work step,
   j) optimizing the occupancy of the magazine slots by the tools, wherein each tool can occupy only one permissible magazine slot without collision, so that an overall waiting period is minimized, wherein the overall waiting period is made up of individual waiting periods that each result from a difference between the detected supply time and the detected work step time if a value of the difference is positive, otherwise the individual waiting period assumes the value zero, and
   k) optimizing the occupancy of the magazine slots by the tools such that these tools are placed in the magazine slots as the initial magazine occupancy or in the permissible magazine slots close to their previously occupied magazine slot without collision.

\* \* \* \* \*